(12) United States Patent
Soulard et al.

(10) Patent No.: US 7,561,568 B2
(45) Date of Patent: Jul. 14, 2009

(54) DEVICE AND METHOD FOR MULTIPLEXING ASSOCIATED WITH A CODING DEVICE

(75) Inventors: Jean-Luc Soulard, Rennes (FR); Pascal Gravoille, Cesson Sevigne (FR); Patrice Alexandre, Cesson Sevigne (FR)

(73) Assignee: Thomson Licensing, Boulogne Billancourt (FR)

( * ) Notice: Subject to any disclaimer, the term of this patent is extended or adjusted under 35 U.S.C. 154(b) by 624 days.

(21) Appl. No.: 11/154,915

(22) Filed: Jun. 16, 2005

(65) Prior Publication Data

US 2006/0002410 A1 Jan. 5, 2006

(30) Foreign Application Priority Data

Jul. 1, 2004 (FR) ................... 04 51394

(51) Int. Cl.
*H04L 12/56* (2006.01)
(52) U.S. Cl. ..................... 370/389; 370/465
(58) Field of Classification Search .......... 370/231, 370/516, 519, 395.1, 392, 465; 713/600
See application file for complete search history.

(56) References Cited

U.S. PATENT DOCUMENTS

| | | | |
|---|---|---|---|
| 5,477,542 A | 12/1995 | Takahara et al. | |
| 5,533,021 A * | 7/1996 | Branstad et al. | 370/396 |
| 5,640,388 A * | 6/1997 | Woodhead et al. | 370/468 |
| 6,353,930 B1 * | 3/2002 | Shimoji et al. | 725/110 |
| 6,493,832 B1 * | 12/2002 | Itakura et al. | 713/600 |
| 6,628,677 B1 | 9/2003 | Kobayashi | |
| 6,654,421 B2 * | 11/2003 | Hanamura et al. | 375/240.26 |
| 6,744,782 B1 * | 6/2004 | Itakura et al. | 370/466 |
| 6,959,042 B1 * | 10/2005 | Liu et al. | 375/240.02 |
| 2001/0033619 A1 * | 10/2001 | Hanamura et al. | 375/240.26 |
| 2002/0103919 A1 | 8/2002 | Hannaway | |
| 2003/0007516 A1 | 1/2003 | Abramov et al. | |
| 2003/0152032 A1 | 8/2003 | Yanagihara et al. | |

FOREIGN PATENT DOCUMENTS

| | | |
|---|---|---|
| EP | 0515101 A | 11/1992 |
| EP | 0915623 A | 5/1999 |
| EP | 0915623 A1 | 5/1999 |
| EP | 1406452 A | 4/2004 |
| GB | 2334860 A | 9/1999 |
| JP | 10-271061 A | 1/1999 |
| JP | 2000-134259 A | 10/2000 |
| JP | 2002-208904 A | 11/2002 |

OTHER PUBLICATIONS

JP2000-134259A Abstract.
JP10-271061A Abstract.
JP2002-208904A Abstract.

* cited by examiner

*Primary Examiner*—Hassan Kizou
*Assistant Examiner*—Emmanuel Maglo
(74) *Attorney, Agent, or Firm*—Robert D. Shedd; Joseph J. Opalach

(57) ABSTRACT

A multiplexing device is coupled to various coding devices. The multiplexing device does not attempt to mutually synchronize the various coding devices but, instead, circumvents such synchronization while making it possible to work with the various coding devices and to obtain synchronous actions at the input of the multiplexer. In particular, the multiplexing device transmits control commands and an instant of action to each of the coding devices.

11 Claims, 2 Drawing Sheets

DEVICE AND METHOD FOR MULTIPLEXING ASSOCIATED WITH A CODING DEVICE

BACKGROUND OF THE INVENTION

The invention relates more particularly to the multiplexing devices associated with coding devices and the interaction between these devices.

The invention applies mainly to the control of a coding device by a multiplexer, and more particularly to the coding of video data.

Specifically, in coding systems including both a coding device and a multiplexing device, each of the devices possessing its own reference clock, it is difficult for a multiplexer to inform a coding device of the time at which it desires to receive a packet from the coding device, since it does not know the local time of the coding device. This is all the more noteworthy when the two devices are remote and the time of transit through the network separating the two devices is not constant but merely bounded.

The invention applies also to statistical multiplexing. Actually, very often the multiplexers of streams of MPEG-2 type for example are responsible for transmitting control cues, for controlling bit rate for example, to the various coding devices. However, these coding devices are not mutually synchronized and it is therefore difficult for a multiplexer to act simultaneously on these coding devices in order that they act at precise instants and that above all their action is received at a precise instant at the level of the multiplexer. The problem is all the more considerable when the coding devices are remote from the multiplexing device or devices since in addition to the asynchronism of the coding devices, the transit time through the networks linking them to the multiplexer is different in each network. The transit time may also vary with each establishment of a new connection through the network.

The known devices implement solutions allowing mutual synchronization between the various coding devices with the multiplexer.

Such solutions are complex to implement, uncompetitive and exhibit a considerable convergence time.

The invention proposes a multiplexing device which does not attempt to mutually synchronize the various coding devices but which circumvents such synchronization while making it possible to work with the various coding devices and to obtain synchronous actions at the input of the multiplexer.

BRIEF SUMMARY OF THE INVENTION

For this purpose, the invention proposes a multiplexing device able to receive data packets from at least one coding device, some of the data packets comprising a time label, said device comprising a time reference and being able to transmit commands to the said coding device. According to the invention, the device comprises:
  means for calculating an instant of action for the coding device at which it desires that the coding device perform the said command as a function of the instant at which it transmits the said command to the said coding device, of the time label of the data packets, of its time reference and of the maximum transfer time between the coding device and the multiplexing device,
  means for transmitting said instant of action and the said command to the coding device.

In a preferred manner, the device is connected to the coding device by way of a transport network on the one hand allowing the transmission of the data packets and by way of a communication network on the other hand allowing the transmission of the commands and of the associated instants of action, the two networks having variable transit times bounded in time, the maximum transfer time between the coding device and the multiplexing device being the sum of the maximum transit times through the two networks.

In a preferred embodiment, the means of calculation calculate the said instant of action according to the following formula:

$$PCRc\_Action = PCRm\_Action + Delta\_Action + DeltaPCRc$$

where PCRm_Action represents the instant at which the multiplexer decides on the said action, where Delta_Action represents the time within which the multiplexer desires to receive the effects of the said action, with Delta_Action>Tcmax+Tsmax, where Delta$PCRc$=$PCRc$–$PCRm$, with PCRm representing the last time reference of the multiplexing device (M) at the instant of reception of the last time label, PRCc, of a data packet.

In a preferred embodiment, the device calculates the difference between the time label of the data packets and its time reference with each reception of a data packet comprising a time label.

In a preferred embodiment, the device is connected to at least two coding devices by way of distinct transport networks allowing the transmission of the data packets and by way of a common communication network allowing the transmission of the commands and the associated instants of action, the said device being adapted to calculate an instant of action for each coding device, in such a way that it receives synchronously the effects of the said command of the various coding devices.

In a preferred embodiment, the device is adapted to transmit bit rate adaptation commands to the said coding devices so as to effect the dynamic bit rate allocation.

In a preferred embodiment, the device is adapted to receive complexity cues synchronized with the time labels of the various coding devices through the said transport networks.

In a preferred embodiment, the device is adapted to receive complexity cues from the various coding devices through the said communication networks, the complexity cues then being marked by the said time label transmitted in a data packet.

In a preferred embodiment, the device transmits bit rate modification commands to the said coding devices (1, C1, C2, ..., Cn) as a function of its bit rate of output and of coding complexities.

In a preferred embodiment, the means of calculation calculate the said instant of action (PCRci_Action) for each coding device (1, C1, C2, ..., Cn) according to the following formula:

$$PCRci\_Action = PCRm\_Action + Delta\_Action + Delta PCRci$$

where PCRm_Action represents the instant at which the multiplexer decides on the said action, where Delta_Action represents the time within which the multiplexer desires to receive the effects of the said action, with Delta_Action>Max(Tscimax)+Max(TcRimax), where Delta$PCRci$=$PCRci$–$PCRmi$, with PCRmi representing the time reference of the multiplexing device (M) upon the reception of the time label, PRCc of each coding device.

The invention also relates to a method of multiplexing in a multiplexing device, able to receive data packets from at least one coding device, some of the data packets comprising a time label, the said device comprising a time reference, the said method comprising a step of transmitting commands to the said coding device, characterized in that it comprises the steps of:

calculating an instant of action at which it desires that the coding device perform the said command as a function of the instant at which it desires to receive the effects of the said command, of the time label of the data packets, of its time reference and of the maximum transfer time between the coding device and the multiplexing device, means of transmitting the said instant and the said command to the coding device.

BRIEF DESCRIPTION OF THE DRAWINGS

The invention will be better understood and illustrated by means of wholly nonlimiting, advantageous exemplary modes of embodiment and implementation, with reference to the appended figures in which.

DETAILED DESCRIPTION OF THE INVENTION

Figure 1:
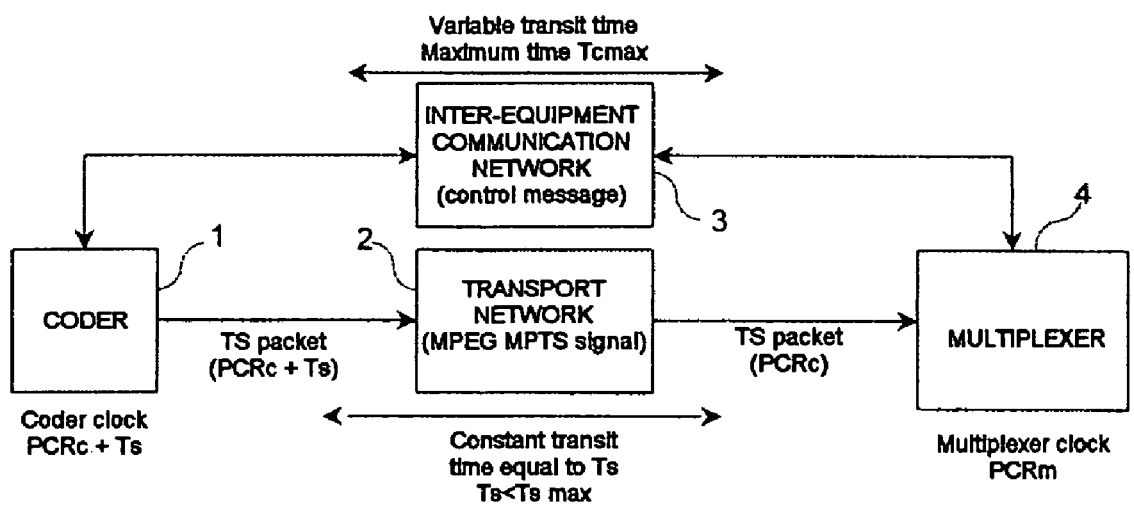
FIG. 1 represents an exemplary system comprising a multiplexing device according to the invention linked to at least one remote coding device.

The modules represented are functional units, which may or may not correspond to physically distinguishable units. For example, these modules or some of them may be grouped together in a single component, or constitute functionalities of one and the same piece of software. Conversely, some modules may possibly be composed of separate physical entities.

The coding device 1 represents a coding device in accordance with the MPEG-2 standard. It produces data packets in the MPEG-2 TS format (TS: the acronym standing for "transport stream").

In other embodiments, it may also comply with the MPEG-4 AVC standard, or with any other standard.

The coding device 1 is linked to a temporal multiplexing device 4 through a transport network 2. The multiplexer 4 is also linked to other coding devices.

The transport network 2 is a network of WAN type (the acronym standing for "Wide Area Network"). Typically, the network 2 is a packet switching network which is furnished with a jitter correction mechanism, such as for example ATM.

The transfer time (Ts) through this network 2 is constant for a given link, unknown but bounded by a maximum value Tsmax. It is different for all the links of the network and becomes constant in the steady state.

The coding device 1 possesses a PCR counter in accordance with the ISO/IEC/13818-1 standard incremented by a clock at 27 Mhz and sends out data packets some of which possess a time label (PCRc). This clock is derived from the incoming video timing in the case of a coding device 1 in accordance with the MPEG-2 standard. PCR signifying program reference clock (PCR being the acronym for "Program Clock Reference").

The multiplexer 4 also possesses a PCR counter organized identically to the PCRc counter and incremented by a clock at 27 Mhz. The clocks of the multiplexer and of the coding device are asynchronous and uncorrelated, the two counters therefore have different values whose difference alters over time as a function of the drifting of the two clocks, each oscillator providing the said clock having a non-zero precision.

The coding device 1 regularly sends a packet carrying the value of its PCR in accordance with the ISO/IEC/13818-1 norm. This norm provides for a packet transporting a PCR packet at least every 0.1 seconds.

When the multiplexer 4 wishes to send a message for the attention of the coding device 1, it transfers the message to it through the intermediary of an inter-equipment network 3. Such a network 3 commonly used is for example a network of WAN type.

The network 3 is also a network whose maximum transfer time (Tc)Tcmax is known, it may exhibit jitter.

In other embodiments, the networks 2 and 3 may be merged into one, when the network 2 is bidirectional.

The multiplexer 4 receives data packets TS from the coding device 1.

With each reception of a packet transporting a PCR of the coding device (PCRc), the multiplexer calculates the time offset between its own PCR, of value PCRm at this instant of reception and that of the coding device PCRc:

$$\text{Delta}PCRc = PCRc - PCRm$$

This offset does not in fact represent the true time offset between the multiplexer 4 and the coding device 1. For this it would be necessary to take into account the transit time Ts through the network. The invention makes it possible to dispense with this knowledge.

The coding device is ahead by Ts, the transit time through the network, which is unknown, but bounded by Tsmax. That is to say the coding device is at the time PCRc+Ts.

Given that the offset between the 27 Mhz clocks used in the coding device and in the multiplexer altering as a function of the sensitivity of the oscillators used to produce the 27 Mhz clocks, it is necessary to recalculate deltaPRCc with each reception of a new value of PCRc. The value of deltaPCRc is therefore updated regularly in the multiplexer.

The multiplexer 4 knowing its time offset between its own PCR (PCRm) and that of the coding device (PCRc), it can dispatch dated orders to the coding device 1 while indicating a value referenced to the PCRc and hence understandable to the latter.

The multiplexer desiring an action of the coding device whose effect at the input of the multiplexer must occur within a time Delta_Action, indicates the following value to the coding device:

$$PCRc\_Action = PCRm\_Action + Delta\_Action + \text{Delta}PCRc$$

PCRm_Action represents the value of the time reference of the multiplexer at the instant at which it decides on an action.

In order for the action to be able to be carried out in time by the coding device, it is necessary that the command arrive before the deadline of the value PCRc_Action. Considering that the command may take up to Tcmax to reach the coding device on the one hand and that on the other hand the PCR of the coding device may be up to Tsmax seconds ahead, it is necessary to have:

$$Delta\_Action > Tcmax + Tsmax$$

In this way, the multiplexer 4 receives at the instant PCRm_Action+Delta_Action the cues pertaining to the command or the effects of the command that it had transferred to the coding device 1, without synchronizing itself with the coding device 1 using complex mechanisms of PLL type (the acronym standing for "Phase Lock Loop").

The invention is particularly advantageous in the case where the multiplexer is synchronized with a modulator situated downstream. When the modulator is informed by the transmission network of a disturbance, for example a storm, the modulator can request the multiplexer to modify its useful bit rate since the network disturbances are considerable, the error rate will increase and it is therefore necessary to modify the error correcting codes. In this case, the multiplexer transmits a command to the coding device situated upstream, indicating for example the new bit rate required and the instant at which it desires that the coding device act.

The multiplexer can then synchronize to the packet ready the bit rate change order with the toggling of the mode of error correction of the modulator situated downstream. For example, the multiplexer can generate an order to the modulator at the precise moment at which the PCRc emanating from the coding device reaches the value that served for the dating of the coding device bit rate change order.

Among the commands which may be cited, there may for example be mentioned the addition or the removal of components associated with a video stream, for example an audio component.

Figure 2:
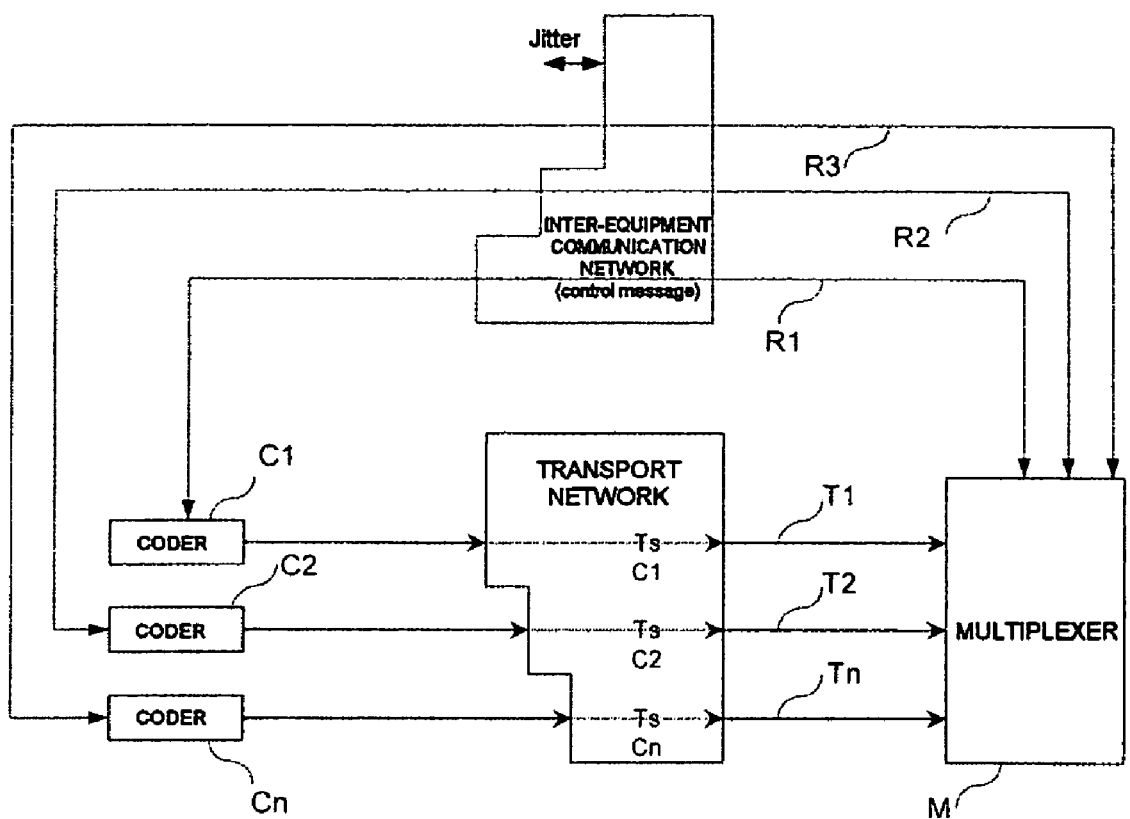
FIG. 2 represents an exemplary system comprising a multiplexing device according to the invention linked to several remote coding devices.

FIG. 2 represents a second particularly advantageous embodiment of the invention in which a multiplexer is linked to at least two coding devices.

The multiplexer may be required to combine the stream of a coding device with other streams emanating from coding devices which it does not command. It also ensures the renewal of the signalling of the stream and may also ensure a scrambling function.

The two coding devices comply with the MPEG-2 standard.

This embodiment is in particular very advantageous within the framework of statistical multiplexing.

The multiplexer generates an output stream of MPTS type (the acronym standing for "Multiple Program Transport Stream") by multiplexing the various streams TS or SPTS (the acronym standing for "Single Program Transport Stream").

The multiplexer allocates a bit rate to each coding device in such a way that the total bit rate of all the coding devices participating in the creation of the MPTS stream does not exceed the output bit rate of the multiplexer. When this allocation is dynamic, one speaks of statistical multiplexing.

The invention makes it possible to ensure that, when the coding devices $C1, C2, \ldots, Cn$ are remote from one another, and from the multiplexer M, the maximum bit rate constraint is complied with at every instant at the input and hence at the output of the multiplexer.

For this purpose, it is necessary that the coding devices $C1, C2, \ldots, Cn$ act on their bit rate, in return for a command transmitted by the multiplexer, and that the bit rate modifications emanating from the coding devices arrive at the multiplexer at precise instants, otherwise there will be bit rate overload or under-load at the multiplexer level. It is in particular necessary that this be true at every instant.

The transport networks $T1, T2, \ldots, Tn$ are networks comparable to the network 2 of FIG. 1, not exhibiting any jitter but a respective transit time $TsC1, Tsc2, \ldots, TsCn$ that is unknown and which differs from one to the other but is bounded.

The multiplexer M is likewise a bit rate allocator. It transmits a bit rate cue to each coding device $C1, C2, \ldots, Cn$, indicating the bit rate allocated to it while taking account of the complexities of the various video streams emanating from the various coding devices and the output bit rate of the multiplexer M.

The complexity cues serving in the calculation of the bit rates are transmitted by each coding device ($C1, C2, \ldots, Cn$) to the multiplexer (M):

1—either by the networks $T1, T2, \ldots, Tn$ in the TS stream in the form of private data 2—or by the networks $R1$ to $Rn$ as long as they are bidirectional.

The complexity cue represents the entropy of the video signal at the input of each coding device. For example, it may be likened to a bit rate level necessary to reach a minimum level of quality after decoding of the image sequences.

In a preferred manner, the complexity cues are transmitted from the coding devices to the multiplexer in the SPTS stream through the networks $T1$ to $Tn$. In this case, these cues are synchronized with the PCRc in such a way as to guarantee that the resulting bit rates of the complexity cues remain synchronized. The multiplexer being required to comply with the minimum execution lag Delta-Action, the bit rates resulting from the last complexities received by the multiplexer will therefore be applied with the same delay Delta-Action by the coding device. In an optimized embodiment, the coding devices are therefore furnished with a means of anticipating their measurement of complexity by the time Delta-Action so as to obtain at any moment a bit rate that is apt for their instantaneous complexity.

In the case where the complexity cues are transported on the networks $R1$ to $Rn$, it is probable that the complexity cues sent by the coding devices do not experience the same crossing times as the SPTS streams. This will engender an uncertainty which translates into a loss of efficiency of the statistical multiplexing mechanism (time offset between bit rate requirement and actual bit rate). To remedy this defect, the coding devices mark each complexity cue with the value of the PCRc field. The multiplexer is then able to "synchronize" the complexity cues mutually on the basis of the time references PCRc emitted in the SPTS streams.

The statistical multiplexing mechanism is described in French Patent Application 9713975 filed on 6 Nov. 1997 in the name of the company Thomson Broadcast Systems.

The multiplexer M transmits through the networks $R1, R2, \ldots, Rn$ respectively commands to the various coding devices $C1, C2, \ldots, Cn$. The network R is a network comparable to the network 3 of FIG. 1 and has a transit time TcR that is unknown and variable but bounded by TcRmax.

The multiplexer transmits bit rate allocation cues to the various coding devices and transmits time cues to the various coding devices $C1, C2, \ldots, Cn$, indicating to each coding device the instant, with respect to its own PCR, at which it must act so that the bit rate modification arrives at the required instant at the multiplexer so as to guarantee appropriate allocation and integrity of the stream at the output of the multiplexer M.

The multiplexer therefore calculates as indicated with reference to FIG. 2, for each coding device a time PCRc_Action such that:

$PCRc1\_Action = PCRm\_Action + Delta\_Action + DeltaPCRc1$ $PCRc2\_Action = PCRm\_Action + Delta\_Action + DeltaPCRc2$ $$PCRcn\_Action=PCRm\_Action+Delta\_Action+DeltaPCRcn$$

with $DeltaPCRci=PCRci-PCRmi$

PCRm_Action represents the instant at which the multiplexer decides on an action and Delta_Action represents the time within which this action must have effects at its input.

PCRmi represents the value of the time reference of the multiplexing device M upon the reception of the time label of the coding device Ci.

And for each coding device:

$$Delta\_Action>Max(Tscimax)+Max(TcRimax)$$

The method therefore avoids having to mutually synchronize the coding devices, this being the solution commonly employed in the solutions known to the person skilled in the art, and to dispense with the transit lag in the transport network, only the maximum time having to be known.

It also avoids storage of the signal for the purposes of resynchronizing the effects of the actions at the multiplexer level, only the control messages are stored in a buffer memory while awaiting the deadline of the respective PCRcs.

The multiplexer therefore receives synchronous actions from the coding devices, while avoiding having to mutually synchronize them and to synchronize them with the multiplexer.

The mechanism can also be used to carry out toggling between two coding devices, one of the coding devices switching from a zero bit rate to a non-zero bit rate and the other doing the reverse.

The precision obtained relating to the instant of reception of the effect of the said command in the multiplexer is a packet level precision.

When the network 2 between the coding device and the multiplexing device 4, with reference to FIG. 1, comprises at least one intermediate multiplexer, the precision of the control is related to the packet jitter introduced by the intermediate multiplexer or multiplexers.

In the case of statistical multiplexing, in an optimized form, the coding devices C1 to Cn are furnished with an ability to anticipate their complexities to a depth TsCimax+TcRimax. Thus, the bit rate preset returned by the multiplexer to each coding device is in phase with the bit rate requirement of the coding device. This constitutes in reality an indispensable element of the implementation once TsCimax+TcRimax exceeds 100 ms, the maximum time between two packets containing a time label.

In practice, the anticipation of the complexities is ensured by the carrying out of a double-coding at the level of each coding device C1, C2, . . . , Cn. The first coding pass calculates the complexity to be dispatched to the multiplexer M and the second pass ensures the actual coding on the basis of the bit rate allocated by the multiplexer M. In this implementation, the minimum lag between the 2 coding passes then equals TsCimax+TcRimax.

What is claimed is:

1. Multiplexing device able to receive data packets from at least one coding device, some of the data packets comprising a time label, said multiplexing device comprising a time reference and being able to transmit control commands to said coding device, wherein said multiplexing device comprises:

means for calculating an instant of action for the coding device at which said multiplexing device desires that the coding device perform said commands as a function of the instant at which said multiplexing device transmits said control commands to said coding device, of the time label of the data packets, of its time reference and of the maximum transfer time between the coding device and the multiplexing device, and means for transmitting said instant of action and said control commands to the coding device.

2. Device according to claim 1 wherein it is connected to the coding device by way of a transport network on the one hand allowing the transmission of the data packets and by way of a communication network on the other hand allowing the transmission of the control commands and of the associated instants of action, the two networks having variable transit times bounded in time, the maximum transfer time between the coding device and the multiplexing device being the sum of the maximum transit times through the two networks.

3. Device according claim 1 wherein the means of calculation calculate said instant of action according to the following formula:

$$PCRc\_Action=PCRm\_Action+Delta\_Action+DeltaPCRc$$

where PCRm_Action represents the instant at which the multiplexer decides on said action, where Delta_Action represents the time within which the multiplexer desires to receive the effects of said action, with Delta_Action>Temax+Tsmax, where DeltaPCRc=PCRc−PCRm, with PCRm representing the last time reference of the multiplexing device at the instant of reception of the last time label, PRCc, of a data packet.

4. Device according to claim 3 wherein it calculates the difference between the time label of the data packets and its time reference with each reception of a data packet comprising a time label.

5. Device according to claim 1 wherein it is connected to at least two coding devices by way of distinct transport networks allowing the transmission of the data packets and by way of a common communication network allowing the transmission of the control_commands and the associated instants of action, said device being adapted to calculate an instant of action for each coding device, in such a way that it receives synchronously the effects of said command of the various coding devices.

6. Device according to claim 5 wherein it is adapted to transmit bit rate adaptation commands to said coding devices so as to effect dynamic bit rate allocation.

7. Device according to claim 6 wherein it is adapted to receive complexity cues synchronized with the time labels of the various coding devices through said transport networks.

8. Device according to claim 6 wherein it is adapted to receive complexity cues from the various coding devices through said communication networks, the complexity cues then being marked by said time label transmitted in a data packet.

9. Device according to claim 6 wherein it transmits bit rate modification commands to said coding devices as a function of its bit rate of output and of coding complexities.

10. Device according to claim 5 wherein the means of calculation calculate said instant of action for each coding device according to the following formula:

$$PCRci\_Action=PCRm\_Action+Delta\_Action+DeltaPCRci$$

where PCRm_Action represents the instant at which the multiplexer decides on said action, where Delta_Action represents the time within which the multiplexer desires to receive the effects of said action, with Delta_Action>Max(Tscimax)+Max(TcRimax),
where DeltaPCRci=PCRci−PCRmi,
with PCRmi representing the time reference of the multiplexing device (M) upon the reception of the time label, PRCc of each coding device.

11. Method of multiplexing in a multiplexing device, able to receive data packets from at least one coding device, some of the data packets comprising a time label, said multiplexing_device comprising a time reference, said method comprising a step of transmitting control_commands to said coding device, wherein it comprises the steps of:

calculating an instant of action at which said multiplexing device desires that the coding device perform said control_commands as a function of the instant at which said multiplexing device desires to receive the effects of said control commands, of the time label of the data packets, of its time reference and of the maximum transfer time between the coding device and the multiplexing device, and means of transmitting said instant and said control_commands to the coding device.

* * * * *